United States Patent [19] [11] 3,783,536
Hanks [45] Jan. 8, 1974

[54] APPARATUS FOR COLLECTING BIOLOGICAL AND/OR GEOLOGICAL SPECIMENS FROM WATERWAYS

[76] Inventor: Fletcher Hanks, c/o Hanks Seafood Co., Inc., P.O. Box 70, Easton, Md. 21601

[22] Filed: Aug. 29, 1972

[21] Appl. No.: 284,763

Related U.S. Application Data

[63] Continuation-in-part of Ser. No. 215,454, Jan. 5, 1972.

[52] U.S. Cl. .......................................... 37/55, 37/58
[51] Int. Cl. ............................................... E02f 3/88
[58] Field of Search .................................. 37/55, 58

[56] References Cited
UNITED STATES PATENTS
3,438,142   4/1969   Krutein ............................. 37/58 X

*Primary Examiner*—Robert E. Pulfrey
*Assistant Examiner*—Clifford D. Crowder
*Attorney*—Robert U. Geib, Jr.

[57] ABSTRACT

An elongate downwardly depending and sternwardly declining cylindrical conduit communicates with the hold of a boat at its upper end and contains an endless belt conveyor which projects from its upper end but terminates short of its lower end. A second, but materially shorter endless belt conveyor is disposed within the cylindrical conduit and at its upper end overlaps the lower end of the first-named endless belt conveyor. A smaller elongate cylindrical conduit is disposed in the first-named cylindrical conduit, and extends beneath the first-named endless belt conveyor with its lower end terminating beneath the intermediate portion of the lower flight of the second-named and materially shorter endless belt conveyor. The upper end of the second-named and smaller elongate cylindrical conduit is connected to the suction side of a suction pump which is carried by the boat. The lowermost end of the first-named cylindrical conduit is closed except for an opening which communicates with the interior of the first-named cylindrical conduit at a position which is immediately above the lower end of the upper flight of the second-named endless belt conveyor. Communicating with the immediately aforementioned opening is an enlarged hose which extends downwardly into the depths of the waterway from which the biological and/or geological specimens are to be recovered. The shorter, and lower, endless belt conveyor is perforate, and the upper and materially longer endless belt conveyor preferably imperforate. The head of water which is maintained on the lower end of the first-named elongate downwardly depending and stern-wardly declining cylindrical conduit will be found to be adequate to raise the specimens referred to and pass them through the aperture in the larger conduit onto the second-named lower endless belt conveyor and through the latter onto the lower end of the first-named endless belt conveyor. Thus, the two endless belt conveyors greatly assist the movement of the specimen upwardly through the larger cylindrical conduit and into the hold of the boat.

4 Claims, 1 Drawing Figure

PATENTED JAN 8 1974
3,783,536
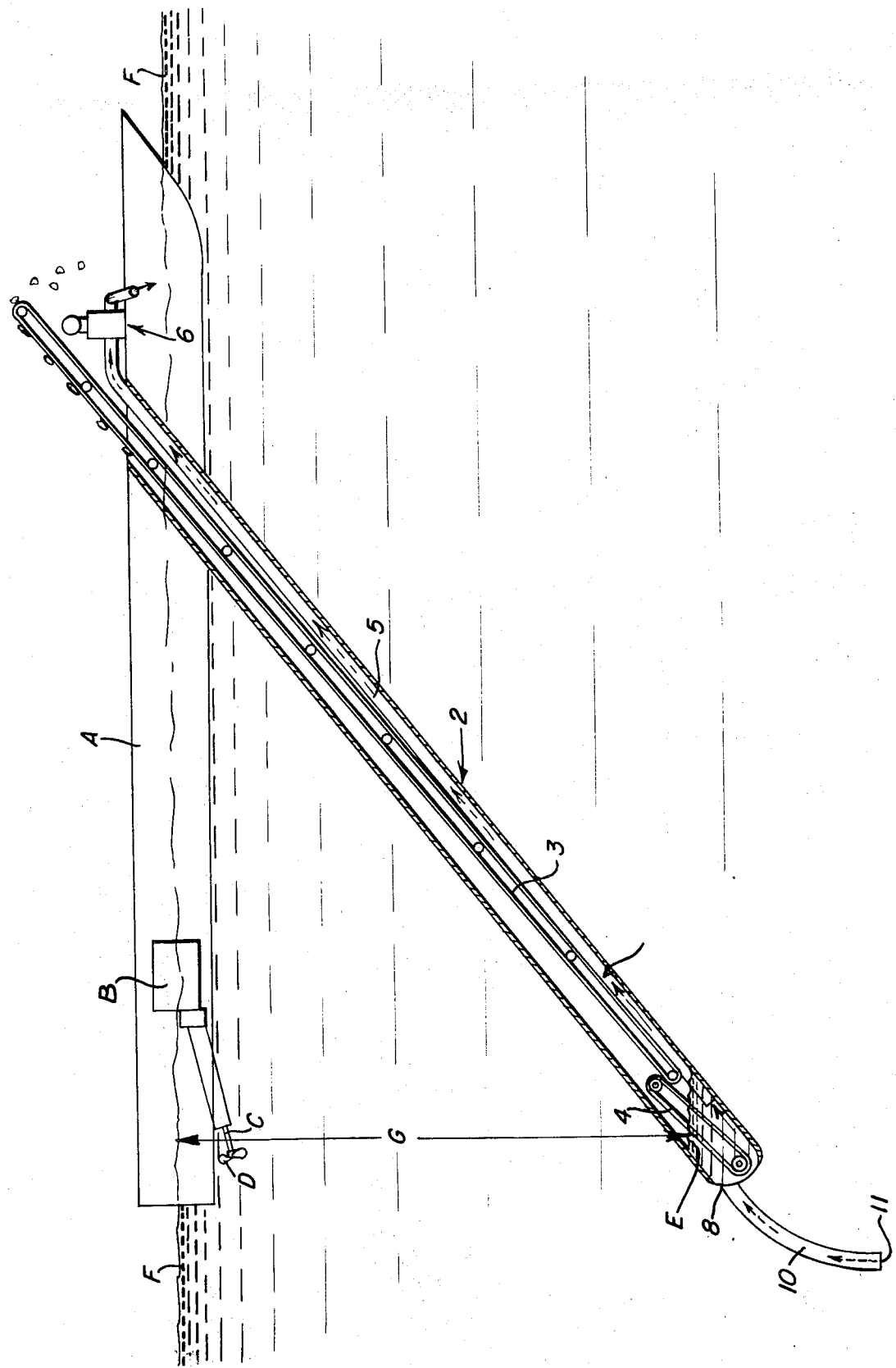

APPARATUS FOR COLLECTING BIOLOGICAL AND/OR GEOLOGICAL SPECIMENS FROM WATERWAYS

The present application is a continuation-in-part application of my presently pending Patent application Ser. No. 215,454, filed Jan. 5, 1972 entitled "Apparatus for Collecting Biological and Geological Specimens."

As mentioned in my aformentioned Patent application Ser. No. 215,454, it is, of course, well known that in the water and on the floors, or in the sub-floors, of large bodies of water, or waterways, significant quantities of biological and geological specimens exist; such as shellfish, lobsters, shrimp, fish, scallops, nodules of valuable ores and so forth.

However, the harvesting or collecting of such specimens and marine nutrients have presented numerous difficulties, some of the methods employed being cumbersome and awkward, or the apparatus inefficient and/or prohibitively expensive.

The apparatus of said prior patent application relies upon the establishment of a head of water which will of itself raise the specimens etc. upwardly and into contact with an endless belt conveyor which delivers them into the hold of a boat.

It is among the objects of the present invention to provide an improved apparatus to harvest or collect specimens of the type referred to the marine nutrients of various kinds, particularly when operating at substantial depths under the surface of the water.

Another object is to attain the foregoing objectives with apparatus which is relatively simple and inexpensive to manufacture, install, operate and maintain.

The foregoing and other objects and advantages will become more apparent after referring to the following description and annexed drawing in which like reference numerals designate like parts, and wherein:

The sole FIGURE is an elevational schematic view illustrating an apparatus which embodies the teachings of the present invention.

Referring more particularly to the drawing, the letter A generally designates a marine vessel in the form of a boat which is powered by the usual internal combustion engine B through the usual propeller shaft and propellers C and D, respectively.

According to the teachings of the present invention, an elongate conduit or enlarged hose 2 extends downwardly from the hold of the boat into the depths of the adjacent waterway, assuming a sternwardly declining angle.

Disposed within the elongate cylindrical conduit 2 is an elongate endless belt conveyor 3 which projects from the upper end thereof but terminates short of the lower end of said conduit as shown.

Also disposed in the cylindrical conduit 2, and adjacent the lower end thereof, is a second and considerably shorter endless belt conveyor 4 which slightly overlaps the first-named endless belt conveyor 3.

A cylindrical conduit or hose 5 of smaller diameter is disposed in the first-named elongate cylindrical conduit 2, terminating at its lower end below and beneath the lower end of said first-named elongate endless belt conveyor 3 to underlie the intermediate portion of the lower flight of the smaller and shorter endless belt conveyor 4.

The upper end of the conduit or hose 5 of smaller diameter is connected to the suction side of a suction pump 6 which discharges overboard; or this water under pressure may be used to assist in harvesting the desired specimens.

For reasons which will appear more fully hereinafter the material of the first-named elongate endless belt conveyor 3 while flexible, is solid or imperforate. The flexible material of the second-named and shorter endless belt conveyor 4 is perforate to permit the passage of water therethrough.

The lower end of the first-named elongate cylindrical conduit 2 is provided, adjacent its upper side, with an inlet aperture 8 which communicates with its interior at a position which is immediately above the lower end of the upper flight of the (second-named) lower end shorter endless belt conveyor 4.

A hose or tube 10 communicates with the aformentioned aperture 8 and extends downwardly into the depths of the waterway and into adjacency with respect to the location of the specimens.

The greater the distance G between the level of the water E in cylindrical conduit 2 and the level of the surface of the water in the waterway F (sea level) the greater will be the head.

The head is necessary to overcome the frictional loss in the conduit and to provide velocity to the water passing through it.

The greater the head then the greater the velocity of the water coming up through the conduit 10 that carries the specimens from below.

The specific gravity of the specimen harvested determines the velocity necessary to lift the specimen through conduit 10 without congestion or stoppage.

The operation of the suction pump 6 maintains the level E of the water in the upper and first-named conduit at the desired low position which, however, is adequate to deliver the specimens, etc. from the lower extremity of the conduit 10, through the same, and 10 onto the upper flight of the lower and shorter endless belt conveyor 4.

Thus, if the head of water which causes the velocity is great enough, the water rising through the lower conduit or tube 10 and upper cylindrical conduit 2 will cause the elevation into the hold of the vessel A of the sought biological and geographical specimens which were below seal level, or on the bottom or sub-bottom of the waterway, such as shellfish, lobsters, shrimp, fish, scallops, nodules of ore containing valuable metals, etc.

I claim:

1. Apparatus for collecting biological and geological specimens from a waterway comprising, in combination,
   a. a marine vessel
   b. a downwardly depending and sternwardly declining conduit of relatively large diameter carried by said marine vessel
   c. an endless belt conveyor centrally disposed in said conduit
   d. the lower end of said endless belt conveyor terminating adjacent to, but spaced from, the lower extremity of said conduit
   e. the upper end of said endless belt conveyor projecting from the upper extremity of said conduit
   f. a second and much shorter endless belt conveyor disposed in said conduit g. the lower end of said second endless belt conveyor being disposed below the lower end of said first-named endless belt conveyor h. the upper end of said second endless belt conveyor being positioned in slightly overlapping relationship with respect to the lower end of said first-named endless belt conveyor i. said first-named conduit having an aperture adjacent its lower extremity which is positioned immediately above the lower end of the upper flight of said second-named endless belt conveyor j. a conduit of considerably smaller diameter disposed in said first-named conduit and extending beneath said first-named endless belt conveyor k. the lower end of said second-named conduit terminating beneath the lower end of said first named endless belt conveyor to underlie the intermediate portion of the lower flight of said second-named endless belt conveyor and l. a suction pump carried by said marine vessel m. the upper end of said second-named conduit being connected to the inlet opening of said suction pump.

2. The apparatus for claim 1 wherein the second-named endless belt conveyor is perforate.

3. The apparatus of claim 1 wherein the first-named endless belt conveyor is substantially imperforate.

4. The apparatus of claim 1 wherein the second-named endless belt conveyor is perforate and the first-named endless belt conveyor is substantially imperforate.

* * * * *